June 18, 1940.   P. E. ROBERTSON   2,204,699
COOKING UTENSIL
Filed July 28, 1937
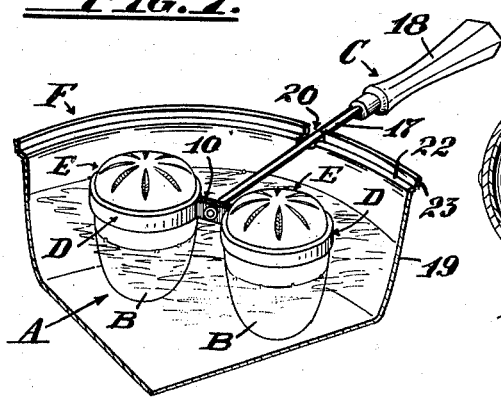
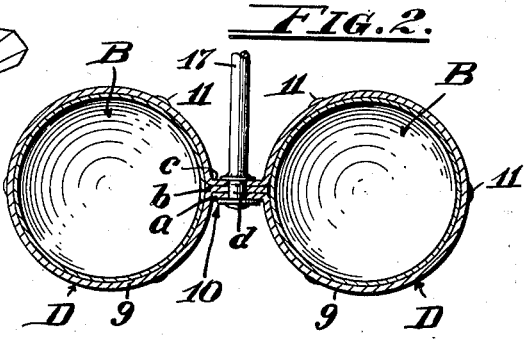
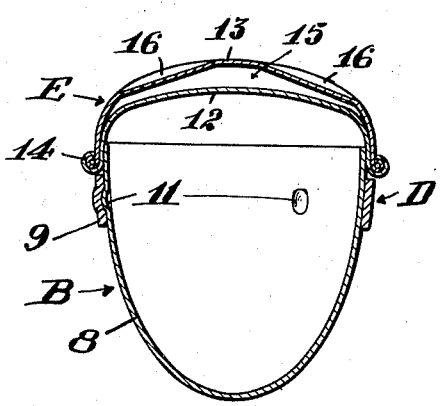
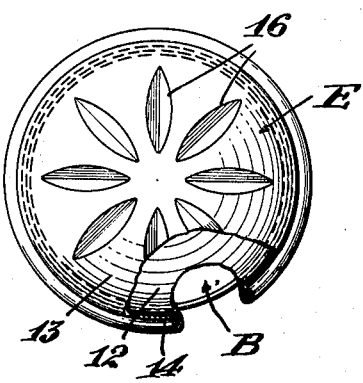
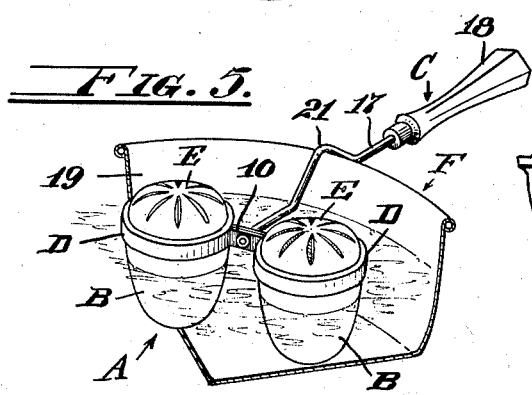
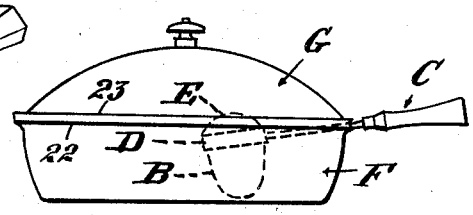
Inventor
Paul E. Robertson
By R. S. Berry
Attorney Patented June 18, 1940

2,204,699

UNITED STATES PATENT OFFICE 2,204,699

COOKING UTENSIL

Paul E. Robertson, North Hollywood, Calif.

Application July 28, 1937, Serial No. 156,154

3 Claims. (Cl. 53—1)

This invention relates to a cooking utensil and more particularly pertains to a cooker of the double boiler type embodying a cooking receptacle for substances to be cooked and which is designed in operation to be at least partially submerged in boiling water in effecting a cooking action on the contents of the receptacle.

An object of the invention is to provide a cooker of the above character which is especially applicable for use in cooking eggs apart from their shells on the double boiler principle, thus enabling the preparation of cooked eggs in a fashion markedly distinguished from the usual modes of cooking eggs as by boiling the eggs in their shells or frying, poaching or coddling, and whereby eggs may be cooked together with seasoning such as fats, oils and condiments.

Another object is to provide an egg cooker in which an egg may be cooked apart from its shell in such manner that the cooked product will have the characteristics of an egg boiled in its shell excepting that the cooking action may be effected in the presence of desired seasoning substances, and in which the degree or extent of cooking of the egg may be readily determined during the cooking operation so as to enable the termination of the cooking action when the egg has been cooked to the desired extent, thus enabling the attainment of cooking of eggs at various degrees of softness or hardness.

Another object is to provide a construction in the cooker whereby inspection of the egg during cooking thereof may be facilitated.

Another object is to provide a construction whereby the cooking cup may be readily positioned in and removed from its associated pan or basin containing boiling liquid.

A further object is to provide a double boiler cooking utensil in which the parts are so formed and arranged as to minimize boiling over and to prevent condensates from overflowing thus avoiding at least to a great extent the objectionable flow of liquid onto the heating element especially where the latter is electrical.

With the foregoing objects in view, together with such other objects and advantages as may subsequently appear, the invention is carried into effect as illustrated by way of example in the accompanying drawing, in which:

Fig. 1 is a view in perspective of a fragmentary portion of the cooking utensil showing it as applied;

Fig. 2 is a view of the cooking receptacle as seen in horizontal section;

Fig. 3 is a view of the cooking receptacle as seen in vertical section;

Fig. 4 is a plan view of the cooking receptacle showing the cover thereof with portions broken away;

Fig. 5 is a perspective of a modified form of the cooking utensil with portions being broken away;

Fig. 6 is a view in side elevation of the cooking utensil.

Referring to the drawing more specifically, A indicates generally a cooker which is here shown as embodying a pair of cooking receptacles B arranged side by side and fitted with a handle C. Each of the receptacles B embodies a bowl shaped cup 8 formed of thin sheet metal of high conductivity, being preferably formed of aluminum.

As here shown the receptacles B are each fitted with and are carried by a metallic ring D formed of a strip 9 of sheet metal bent to form the pair of rings D and to provide a short web 10 connecting the rings, and which web is formed of the end portions $a$ and $b$ of the metal strip overlying each other and collectively overlying an intermediate portion $c$ of the strip 9. The cups 8 and rings D are interconnected by fastenings 11 as by indenting the walls of the cups into engagement with the rings at suitable intervals such as to effect a secure connection between the cups and rings.

The rings D are positioned on the cups 8 so that their upper margins will be disposed on a plane spaced below the upstanding smooth margins of the open ends of the cups, as particularly shown in Fig. 3, whereby the margin of each of the cups may be telescopically engaged with a removable cover E in close frictional engagement therewith.

Each of the covers E embodies an inner wall portion 12 and an outer wall portion 13 which wall portions are interconnected at their margins by beading the edges together to form the cover in the shape of a cap having an outwardly projecting marginal bead 14. The inner periphery of the marginal portion of the cap is smooth and slightly tapered so as to receive the smooth marginal portion of the cup in telescoped wedge engagement therewith. The intermediate portions of the walls 12 and 13 are spaced apart to form a dead air space 15 therebetween which will serve as insulation, and the outer wall 13 is formed with a series of radially extending flutes 16 which serve to increase the radiating surface of the cover. The walls 12 and 13 of the cover are formed of aluminum or other metal of rapid heat conductive and radiating properties.

The web 10 is formed with a central opening $d$ to receive the outer end of the metal shank 17 of the handle C, which shank passes through the opening $d$ and is affixed to the web 10 as by riveting. The shank 17 of the handle C leads from the web 10 perpendicular thereto and is fitted at its outer end with an insulated hand hold 18.

The cooker A is designed to be employed in conjunction with a pan or basin F having an upstanding side wall 19 which is preferably formed with a notch 20 on its upper margin to receive the shank 17 of the handle C as shown in Fig. 1, and which notch will serve as a steam outlet where the pan F is fitted with a lid G in the fashion common in chaffing dishes. In some instances, however, where the rim of the pan is not provided with a notch 20 the shank 17 may be formed with a V-bend 21 as shown in Fig. 5 arranged to be positioned astride the margin of the side wall 19 of the pan.

However, in adapting the invention for use on electric stoves, the construction shown in Figs. 1 and 6 is preferably employed, in which construction the upper margin of the annular side wall 19 of the pan is offset outwardly from the side wall to provide an internal shoulder 22 at the base of a marginal lip 23, and the cover G is formed of a diameter to seat on the shoulder and extend interiorly of the lip 23 so that vapors condensing on the underside of the lid when applied will drain into the pan.

In the application and operation of the invention when the utensil is employed in the cooking of eggs, the receptacle B is greased as by placing oil or fat therein, whereupon an egg is broken into the cup 8 and condiments added. The cover E is then applied to the cup as shown in Fig. 3 whereupon the latter is placed in boiling water contained in the pan F whereby a cooking action is effected on the contents of the cup in the fashion common to double boilers. The cover E fits on the cup sufficiently tight as to permit the building up of a slight pressure interiorly of the cup during the cooking operation. Manifestly the degree of cooking of the contents of the cup may be observed from time to time by removing the cover E. Positioning the cover G on the pan precluded the rise of vapors therefrom except such as escape through the notch 20, or beneath the edge of a lid or cover seating on the bend 21 where the construction shown in Fig. 5 is employed.

While I have shown and described the utensil as embodying a pair of receptacles B it is manifest that the number of such receptacles may be increased or diminished as occasion may require without departing from the spirit of the invention, and it is manifest that while the device is especially applicable for use in cooking eggs it may also be employed in the cooking of other foods where it is desired to prepare such foods in small individual quantities.

I claim:

1. In an egg cooker, a cooking cup having an upstanding marginal rim, a ring encompassing and rigidly affixed to said cup adjacent to but spaced from the edge of said rim, a handle affixed to said ring, and a cover formed to extend over the open end of said cup with the margin thereof in close telescopic engagement with the outer face of said rim, said cover being formed of a pair of metallic walls united throughout the telescoping marginal portion thereof and spaced apart throughout their intermediate portions.

2. In an egg cooker, a cooking cup, a ring encompassing said cup, a handle affixed to said ring, a cover formed to extend over the open end of said cup, said cover being formed of a pair of metallic walls united at their margins and spaced apart throughout their intermediate portions, and a series of radial radiating flutes on the outer of said walls.

3. In an egg cooker, a cooking cup, a cover for said cup formed of a pair of metallic walls united at their margins and spaced apart throughout their intermediate portions, and a series of flutes on the outer of said walls to increase the radiating surface of said cover.

PAUL E. ROBERTSON.